US011086674B2

(12) United States Patent
Burhani et al.

(10) Patent No.: US 11,086,674 B2
(45) Date of Patent: Aug. 10, 2021

(54) TRADE PLATFORM WITH REINFORCEMENT LEARNING NETWORK AND MATCHING ENGINE

(71) Applicant: ROYAL BANK OF CANADA, Montreal (CA)

(72) Inventors: Hasham Burhani, Peterborough (CA); Zichang Long, Bradford (CA); Jonathan Cupillari, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 0 days.

(21) Appl. No.: 16/423,082

(22) Filed: May 27, 2019

(65) Prior Publication Data

US 2019/0361739 A1     Nov. 28, 2019

Related U.S. Application Data

(60) Provisional application No. 62/676,707, filed on May 25, 2018.

(51) Int. Cl.
*G06F 9/50*     (2006.01)
*G06F 9/48*     (2006.01)
(Continued)

(52) U.S. Cl.
CPC .................. *G06F 9/50* (2013.01); *G06F 9/48* (2013.01); *G06F 9/4881* (2013.01);
(Continued)

(58) Field of Classification Search
CPC .......... G06Q 40/00; G06Q 40/04; G06N 5/00; G06N 20/00; G06F 9/50; G06F 9/5005; G06F 9/48; G06F 9/4881
See application file for complete search history.

(56) References Cited

U.S. PATENT DOCUMENTS 6,311,178 B1    10/2001  Bi et al.
2002/0046134 A1*  4/2002  Egashira ............... G06Q 40/04
                                           705/26.3
(Continued)

FOREIGN PATENT DOCUMENTS

WO     2018083671 A1    5/2018

OTHER PUBLICATIONS

Duerson et al, "Reinforcement Learning in Online Stock Trading Systems", Geogeria Institute of Technology, pp. 1-9 (Year: 2005).*

(Continued)

*Primary Examiner* — Charles M Swift
(74) *Attorney, Agent, or Firm* — Norton Rose Fulbright Canada LLP

(57) ABSTRACT

A system for reinforcement learning in a dynamic resource environment includes at least one memory and at least one processor configured to provide an electronic resource environment comprising: a matching engine and the resource generating agent configured for: obtaining from a historical data processing task database a plurality of historical data processing tasks, each historical data processing task including respective task resource requirement data; for a historical data processing task of the plurality of historical data processing tasks, generating layers of data processing tasks wherein a first layer data processing task has an incremental variant in its resource requirement data relative to resource requirement data for a second layer data processing task; and providing the layers of data processing tasks for matching by the machine engine.

29 Claims, 5 Drawing Sheets

(51) Int. Cl.
  *G06N 20/00*  (2019.01)
  *G06Q 40/00*  (2012.01)
  *G06N 5/00*  (2006.01)
(52) U.S. Cl.
  CPC ............ *G06F 9/5005* (2013.01); *G06N 5/00* (2013.01); *G06N 20/00* (2019.01); *G06Q 40/00* (2013.01)

(56) References Cited

U.S. PATENT DOCUMENTS

| | | | |
|---|---|---|---|
| 2014/0081818 A1* | 3/2014 | Co | G06Q 40/04 705/37 |
| 2014/0122143 A1* | 5/2014 | Fletcher | G06Q 10/0631 705/7.14 |
| 2017/0109824 A1* | 4/2017 | Gunzinger | G06Q 40/04 |
| 2017/0351318 A1* | 12/2017 | Gu | G06F 9/30083 |
| 2018/0040068 A1 | 2/2018 | Noonan | |
| 2018/0232807 A1* | 8/2018 | Crabtree | G06Q 30/0201 |
| 2019/0287172 A1* | 9/2019 | Petruzzi | G06Q 40/04 |

OTHER PUBLICATIONS

Lee et al, "A Multiagent Approach to Q-Learning for Daily Stock Trading", IEEE, 2007, pp. 864-877 (Year: 2007).*
Extended European Search Report issued European Application No. 19176793.8, dated Nov. 7, 2019.
Jae Won et al., "An Intelligent Stock Trading System Based on Reinforcement Learning", IEICE Transactions on Information and Systems, vol. E86-D, No. 2, Feb. 1, 2003, p. 296-305.

* cited by examiner

TRADE PLATFORM WITH REINFORCEMENT LEARNING NETWORK AND MATCHING ENGINE

CROSS-REFERENCE TO RELATED APPLICATIONS

This application claims all benefit including priority to U.S. Provisional Patent Application 62/676,707, filed May 25, 2018, and entitled "TRADE PLATFORM WITH REINFORCEMENT LEARNING NETWORK AND MATCHING ENGINE"; the entirety of which is hereby incorporated by reference.

FIELD

Aspects of the present disclosure relate to the field of reinforcement learning, and particularly aspects of the present disclosure relate to systems and methods for reinforcement learning in a dynamic resource environment.

INTRODUCTION

In some environments, such as electronic trading environments, actors sometimes compete for resources at the expense of or in competition with others for resources. Machine learning agents are often trained to operate in these environments based on historical actions; however, such static data does not necessarily capture the dynamic or interactive nature of these environments.

SUMMARY

In accordance with an aspect, there is provided a trade execution platform integrating a reinforcement learning process with a matching engine to provide a simulation environment.

In accordance with an aspect, there is provided a computer-implemented system for reinforcement learning in a dynamic resource environment, the system comprising: at least one memory and at least one processor configured to provide an electronic resource environment comprising: a matching engine and a resource generating agent. The matching engine configured for: receiving a plurality of data processing tasks from at least one reinforcement learning agent and a resource generating agent, each data processing task including task resource requirement data identifying: a resource action indicating whether the data processing task is providing or consuming a resource, a cost of the resource, and a quantity of the resource to be provided or consumed; from the plurality of received data processing tasks, matching a first data processing task with a second data processing task when the resource requirement data of the first data processing task indicates the first data processing task is consuming a first quantity of a first resource, and when the resource requirement data of the second data processing task indicates the second data processing task is providing at least the first quantity of the first resource and satisfies the cost of the first resource; generating signals for executing the first data processing task and the second data processing task; and generating signals for communicating unmatched data processing tasks of the plurality of received data processing tasks to the at least one reinforcement learning agent. The resource generating agent configured for: obtaining from a historical data processing task database a plurality of historical data processing tasks, each historical data processing task including respective task resource requirement data; for a historical data processing task of the plurality of historical data processing tasks, generating layers of data processing tasks wherein a first layer data processing task has an incremental variant in its resource requirement data relative to resource requirement data for a second layer data processing task; and providing the layers of data processing tasks for matching by the machine engine.

In accordance with an aspect, there is provided a computer-implemented method for reinforcement learning in a dynamic resource environment. The method includes: receiving, with a matching engine, a plurality of data processing tasks from at least one reinforcement learning agent and a resource generating agent, each data processing task including task resource requirement data identifying: a resource action indicating whether the data processing task is providing or consuming a resource, a cost of the resource, and a quantity of the resource to be provided or consumed; from the plurality of received data processing tasks, matching a first data processing task with a second data processing task when the resource requirement data of the first data processing task indicates the first data processing task is consuming a first quantity of a first resource, and when the resource requirement data of the second data processing task indicates the second data processing task is providing at least the first quantity of the first resource and satisfies the cost of the first resource; generating signals for executing the first data processing task and the second data processing task; generating signals for communicating unmatched data processing tasks of the plurality of received data processing tasks to the at least one reinforcement learning agent; obtaining from a historical data processing task database a plurality of historical data processing tasks, each historical data processing task including respective task resource requirement data; for a historical data processing task of the plurality of historical data processing tasks, generating layers of data processing tasks wherein a first layer data processing task has an incremental variant in its resource requirement data relative to resource requirement data for a second layer data processing task; and providing the layers of data processing tasks for matching by the machine engine.

In accordance with an aspect, there is provided a non-transitory, computer readable medium or media having stored thereon data defining a reinforcement learning agent configured for competing for resources and trained in an electronic resource environment comprising: a matching engine configured for: receiving a plurality of data processing tasks from at least one reinforcement learning agent and a resource generating agent, each data processing task including task resource requirement data identifying: a resource action indicating whether the data processing task is providing or consuming a resource, a cost of the resource, and a quantity of the resource to be provided or consumed; from the plurality of received data processing tasks, matching a first data processing task with a second data processing task when the resource requirement data of the first data processing task indicates the first data processing task is consuming a first quantity of a first resource, and when the resource requirement data of the second data processing task indicates the second data processing task is providing at least the first quantity of the first resource and satisfies the cost of the first resource; generating signals for executing the first data processing task and the second data processing task; and generating signals for communicating unmatched data processing tasks of the plurality of received data processing tasks to the at least one reinforcement learning agent; and the resource generating agent configured for: obtaining from a historical data processing task database a plurality of historical data processing tasks, each historical data processing task including respective task resource requirement data; for a historical data processing task of the plurality of historical data processing tasks, generating layers of data processing tasks wherein a first layer data processing task has an incremental variant in its resource requirement data relative to resource requirement data for a second layer data processing task; and providing the layers of data processing tasks for matching by the machine engine.

For any of the foregoing, in some embodiments, generating the signals for executing the first data processing task and the second data processing task comprises: generating signals for communicating, to a reinforcement learning agent associated with the first data processing task or the second data processing task, executed task data identifying the matched data processing task, the consumed resource, the cost of the resource, and the quantity of the consumed resource; the executed task data providing input or state data for the reinforcement learning agent.

For any of the foregoing, in some embodiments, generating the signals for executing the first data processing task and the second data processing task comprises: generating signals for communicating, to a reinforcement learning agent not associated with the first data processing task or the second data processing task, executed task data identifying the matched data processing task, the consumed resource, the cost of the resource, and the quantity of the consumed resource; the executed task data providing input or state data for the reinforcement learning agent.

For any of the foregoing, in some embodiments, the resource generating agent is configured for: normalizing a historical data processing task of the plurality of historical data processing tasks with a normalization function to generate a normalized historical data processing task with a normalized quantity; and generating the layers of data processing tasks from the normalized historical data processing task.

For any of the foregoing, in some embodiments, the resource generating agent is configured for: sampling from a time-ordered set of data processing tasks to obtain the plurality of historical data processing tasks.

For any of the foregoing, in some embodiments, the first layer data processing task has a higher or lower resource quantity requirement than the second layer data processing task.

For any of the foregoing, in some embodiments, the sampling increases the randomness and base quantity of resources available in the unmatched data processing tasks.

For any of the foregoing, in some embodiments, the at least one processor manages a clock for the electronic resource environment, the clock for the electronic resource environment is faster than a wall clock time.

For any of the foregoing, in some embodiments, the at least one processor advances the clock for the electronic resource environment by one time interval once the matching engine has processed all possible matches in a current clock interval.

For any of the foregoing, in some embodiments, the at least one processor advances the clock for the electronic resource environment by one time interval once the reinforcement learning agent has processed a current state of the electronic resource environment and has submitted any data processing tasks based on the current state of the electronic resource environment.

For any of the foregoing, in some embodiments, the at least one processor advances the clock for the electronic resource environment based on a longest processing time required by: the at least one reinforcement learning agent, the matching engine, and the resource generating agent to complete their respective computations for a current time interval.

For any of the foregoing, in some embodiments, the normalization function is based on a normalization hyperparameter, wherein adjusting the hyperparameter adjusts available resources in the electronic resource environment provided by the resource generating agent.

For any of the foregoing, in some embodiments, generating the layers of data processing tasks is based on a variance hyperparameter, wherein a higher variance hyperparameter results in a high likelihood that data processing tasks generated by the resource generating agent will be matched with other data processing tasks generate by the resource generating agent rather than the at least one reinforcement learning agent.

For any of the foregoing, in some embodiments, the electronic resource environment provides an environment in which a plurality of reinforcement learning agents are training in competition for resources.

In accordance with an aspect, there is provided a reinforcement learning system having: data storage storing a reinforcement learning network for receiving input data to generate output data, the input data representing a trade order; a processor configured with machine executable instructions to train the reinforcement learning network using a matching engine simulating a trading exchange and competing against other reinforcement learning networks based on non-deterministic rules.

In some embodiments, the matching engine instantiates with a baseline market projection based on historical market data that is continuously maintained by a derivative liquidity process.

In some embodiments, the reinforcement learning network generates actions based on market observations and commits the actions to the matching engine to change a state of the simulated trading exchange.

In some embodiments, the reinforcement learning network evaluates the action based on the changed state of the simulated trading exchange as a learning feedback loop.

In some embodiments, the matching engine samples orders and enriches the sampled order by volume normalization and price layering.

In accordance with an aspect, there is provided a process for a reinforcement learning network that involves, at a processor, training a reinforcement learning network using a matching engine to implement a trading exchange defined by liquidity, counter parties, market makers and exchange rules; processing input data using the reinforcement learning network, the input data representing a parent trade order; computing output data using the reinforcement learning network.

In some embodiments, the process involves using a liquidity filter to process the received input data for provision to the machine engine.

In some embodiments, the process involves training the reinforcement learning network using the matching engine by competing against other reinforcement learning networks based on non-deterministic rules.

In accordance with an aspect, there is provided a platform having: data storage storing a reinforcement learning network for receiving input data to generate output data, the input data representing a trade order; a processor configured with machine executable instructions to provide a matching engine to implement a trading exchange defined by liquidity, counter parties, market makers and exchange rules, the matching engine for training the reinforcement learning network using the training exchange.

In some embodiments, the processor is configured to provide a liquidity filter to process the received input data for provision to the machine engine.

In some embodiments, the matching engine is configured to train the reinforcement learning network by competing against other reinforcement learning networks based on non-deterministic rules.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

Machine learning can be applied to many diverse applications. However, the machine learning will ultimately depend on the quality of input data. In some environments, multiple actors may be interacting with or competing for the same resources or end goals. In some environments, the vast number of potential factors or inputs to a machine learning system can make it difficult to provide a suitable training data set. In some environments, releasing a machine learning architecture into a live environment to train and adapt to real world situations may be costly, unsafe, risky or not in compliance with rules or regulations.

In some embodiments, aspects of the present disclosure may provide a system for machine learning in a dynamic resource environment. In some embodiments, this environment may provide a training environment for agents competing or interacting for the same electronic resources. For example, in some embodiments, aspects of the embodiments described herein may provide a dynamic resource environment for training machine learning agents to generate and interact with its own or other agents' data processing tasks which require different electronic resources. In some embodiments, the dynamic resource environment provides an environment for training machine learning agents for electronic stock market trading.

Embodiments of methods, systems, and apparatus are described through reference to the drawings.

Figure 1:
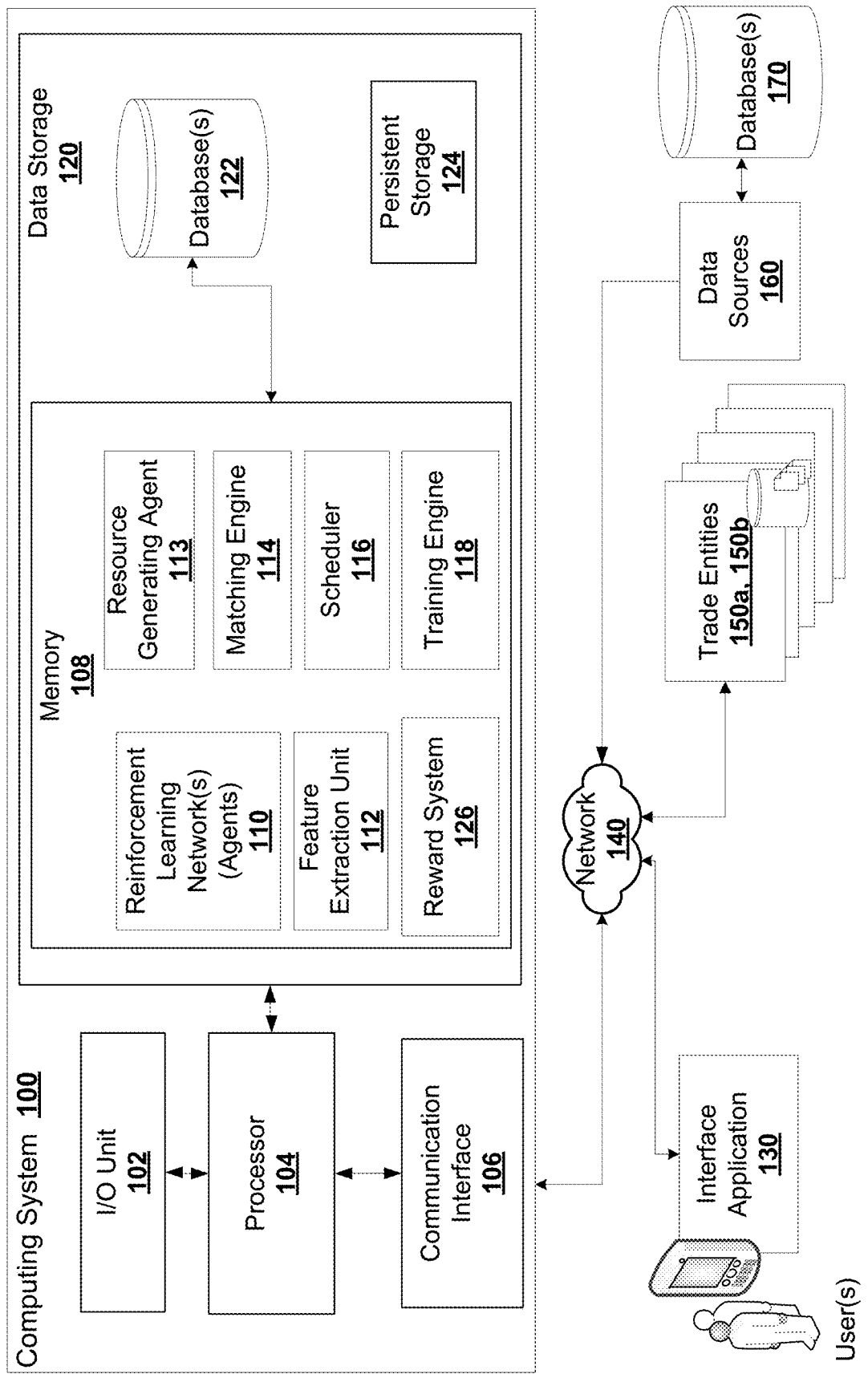
FIG. 1 is a schematic diagram showing aspects of an example computing system providing a trading platform according to some embodiments.

FIG. 1 is a schematic diagram showing aspects of an example computing system 100 according to some embodiments. The computing system 100 can implement aspects of the processes described herein. In some embodiments, the computing system can provide a dynamic resource environment. In some embodiments, the dynamic resource environment can be a trading platform on which machine learning agents can be trained.

The computing system 100 has a matching engine 114 to provide an artificial stock market environment for training deep reinforcement learning networks 110 (which can be referred to as agents) using a training engine 118. The matching engine 114 can implement a performant stock market simulation environment designed to provide rich datasets and ever changing experiences to reinforcement learning networks 110 in order to accelerate and improve their learning.

The computing system 100 can train one or more reinforcement learning network(s) 110 (which can also be referred to as reinforcement learning agent 110) using training engine 118 and matching engine 114. The trained reinforcement learning networks 110 can be used by computing system 100 or other system. In some embodiments, the trained reinforcement learning networks 110 can receive data from one or more data sources 160 which can provide market data, and based on this received data and its previous training, can transmit one or more data processing tasks representing electronic trade instructions to trade entities 150a, 150b, in some embodiments. The computing system 100 can process trade orders using the reinforcement learning network 110 in response to commands or data messages from trade entities 150a, 150b, in some embodiments. Trade entities 150a, 150b can interact with the computing system to receive output data and provide input data. The trade entities 150a, 150b can have at least one computing device. In some embodiments, a trade entity can represent one or more order processing engines at a stock exchange.

The computing system 100 can connect to an interface application 130 installed on user device to receive input data. Through a common interface, in some embodiments, the matching engine 114 can provide a shared environment where multiple reinforcement learning networks 110 or agents can participate and compete against each other in this simulated exchange where each agents' actions directly impact the state of the simulated market. This provides a continuously evolving dataset for high quality training of reinforcement learning network 110.

In other approaches, machine learning agents are trained on historical trade data. However, these other approaches, may not appreciate or otherwise respond effectively to dynamic additions and removals of electronic resources in a computing environment. In some embodiments, aspects of the present disclosure may train reinforcement learning agents 110 to understand, recognize and/or have an improved response to dynamic changes in the availability of electronic resources due to the actions of other actors or otherwise. In some embodiments, aspects of the present disclosure may train reinforcement learning agents 110 to understand, recognize and/or have an improved response to dynamic changes (e.g. addition or removal) in liquidity of electronic stock exchange resources.

The computing system 100 can connect to different data sources 160 and databases 170 to receive input data and receive output data for storage. In some embodiments, the input data can represent trade orders, quotes, and/or other market data. Network 140 (or multiple networks) is capable of carrying data and can involve wired connections, wireless connections, or a combination thereof. Network 140 may involve different network communication technologies, standards and protocols, for example.

The computing system 100 can include an I/O Unit 102, a processor 104, communication interface 106, and data storage 120. The I/O unit 102 can enable the computing system 100 to interconnect with one or more input devices, such as a keyboard, mouse, camera, touch screen and a microphone, and/or with one or more output devices such as a display screen and a speaker.

In some embodiments, the computing system 100 can includes one or more processors 104 at one or more physical and/or logical computing machines. In some embodiments, the computing system 100 may comprise a single computer/machine/server. In some embodiments, the computing system 100 may include multiple processors spread across multiple physical machines and/or network locations (e.g. in a distributed computing environment). The term processor should be understood to any of these embodiments whether described in singular or plural form.

The processor 104 can execute instructions in memory 108 to implement aspects of processes described herein. The processor 104 can execute instructions in memory 108 to configure a data collection unit, interface unit (to provide control commands to interface application 130), reinforcement learning network 110, feature extraction unit 112, matching engine 114, scheduler 116, training engine 118, reward system 126, and other functions described herein. The processor 104 can be, for example, any type of general-purpose microprocessor or microcontroller, a digital signal processing (DSP) processor, an integrated circuit, a field programmable gate array (FPGA), a reconfigurable processor, or any combination thereof.

Reinforcement learning network 110 receives input data (via a data collection unit) and generates output data for provision to trade entities 150a, 150b. Reinforcement learning network 110 can refer to a neural network that implements reinforcement learning.

Figure 2:
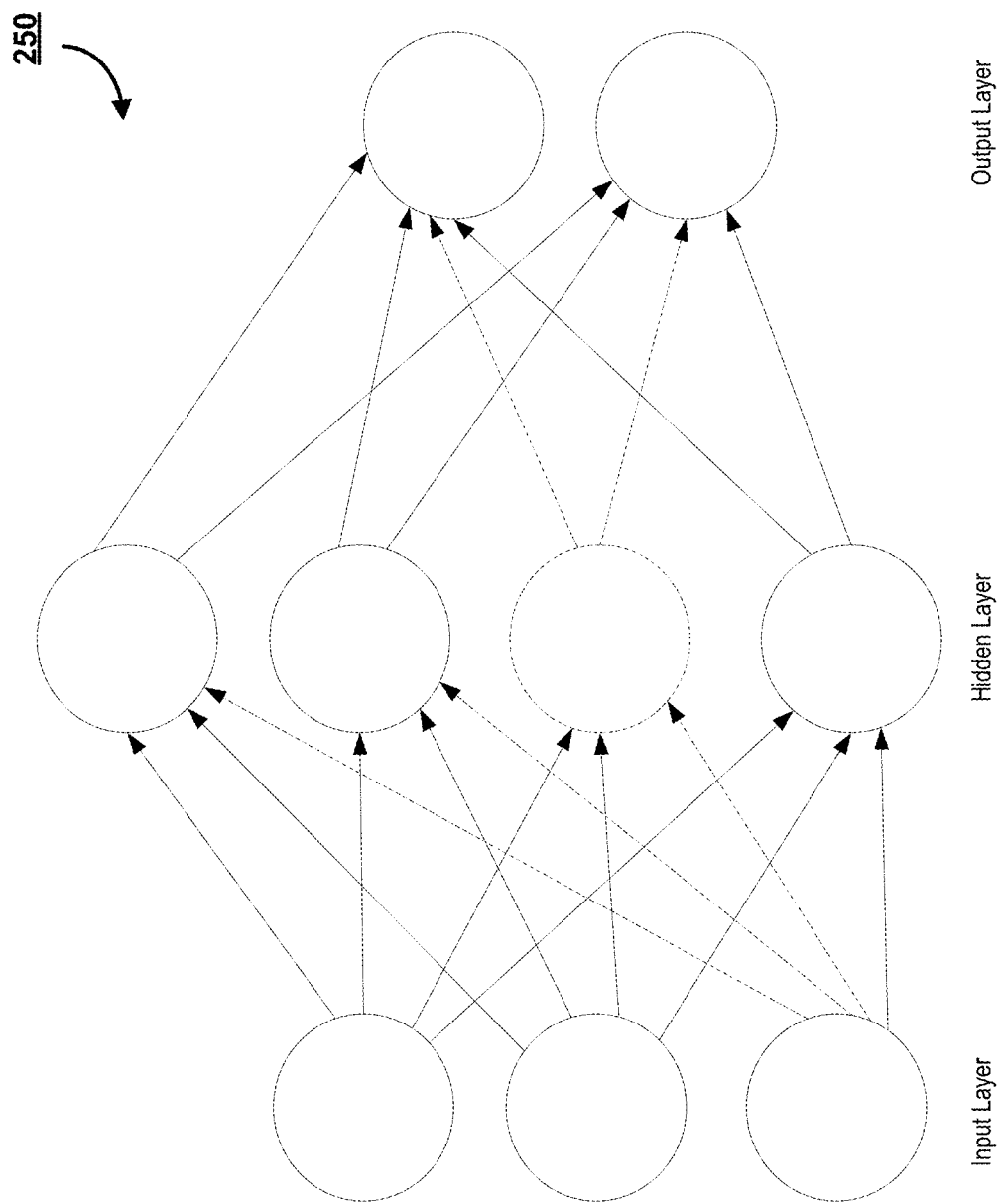
FIG. 2 is a schematic diagram showing aspects of an example neural network according to some embodiments.

FIG. 2 is a schematic diagram of an example neural network 250 according to some embodiments. The example neural network 250 can include an input layer, a hidden layer, and an output layer. The neural network 250 processes input data using its layers based on reinforcement learning, for example.

Reinforcement learning is a category of machine learning that configures agents (which can be referred to as reinforcement learning network 110) to take actions in an environment to maximize a notion of a reward. The processor 104 is configured with machine executable instructions to train the reinforcement learning network 110 using a training unit 118. The processor 104 is configured to use the reward system 126 in relation to the reinforcement learning network 110 actions to generate good signals and bad signals for feedback to the reinforcement learning network 110. In some embodiments, the reward system 126 generates good signals and bad signals to minimize Volume Weighted Average Price slippage, for example. Reward system 126 is configured to receive control the reinforcement learning network 110 to process input data in order to generate output data. The input data can represent a trade order.

Feature extraction unit 112 is configured to process input data to compute a variety of features. The input data can represent a trade order. Example features include pricing features, volume features, time features, Volume Weighted Average Price features, market spread features.

A reward system 126 integrates with the reinforcement learning network 110, to control what constitutes good and bad results within the environment (e.g. the simulation environment generated by matching engine 114). In some embodiments, the reward system 126 can implement a process in which reward data is normalized and converted into the reward that is fed into models of reinforcement learning networks 110. For learning, the reinforcement learning network 110 is configured with the ability to automatically learn based on good and bad signals generated by the reward system 126.

Matching engine 114 is configured to implement a training exchange defined by liquidity, counter parties, market makers and exchange rules. The Matching engine 114 can be part of a highly performant stock market simulation environment designed to provide rich datasets and ever changing experiences to reinforcement learning networks 110 (e.g. agents) in order to accelerate and improve their learning. The processor 104 may be configured to provide a liquidity filter to process the received input data for provision to the machine engine 114, for example. Scheduler 116 is configured to control the reinforcement learning network 110 within schedule satisfaction bounds computed using order volume and order duration.

The interface unit 130 interacts with the trading computing system 100 to exchange data (including control commands) and generates visual elements for display at user device. The visual elements can represent reinforcement learning networks 110 and output generated by reinforcement learning networks 110.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 120 can include memory 108, databases 122, and persistent storage 124.

The communication interface 106 can enable the computing system 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WMAX), SS7 signaling network, fixed line, local area network, wide area network, and others, including any combination of these.

The computing system 100 can be operable to register and authenticate users (using a login, unique identifier, and password for example) prior to providing access to applications, a local network, network resources, other networks and network security devices. The computing system 100 may serve multiple users which may operate trade entities 150a, 150b.

The data storage 120 may be configured to store information associated with or created by the components in memory 108 and may also include machine executable instructions. The data storage 120 includes a persistent storage 124 which may involve various types of storage technologies, such as solid state drives, hard disk drives, flash memory, and may be stored in various formats, such as relational databases, non-relational databases, flat files, spreadsheets, extended markup files, etc.

Matching Engine

Reinforcement learning process are data heavy, and they are not necessarily dependent on historical data like conventional supervised machine learning processes. In some embodiments, the data is collected by the reinforcement learning network 110 itself or computing system 100. The data can be referred to as "experiences". To use reinforcement learning to trade effectively, the reinforcement learning network 110 may be trained on the exchange directly but that can use resources. In some embodiments, an improvement is provided so that the reinforcement learning network 110 uses the matching engine 114 with its created exchange with liquidity, counter parties, market makers and rules. In some embodiments, processor 104 may be configured to provide a liquidity filter to process the received input data for provision to the machine engine 114.

The following provides an illustrative example. At the start of each simulated trading day, the machine engine 114 can instantiated with a baseline market projection based on historical market data, which is then continuously maintained by a liquidity provisioning process. During an agent's (e.g. reinforcement learning network 110) early learning stages, the baseline movements help the reinforcement learning network 110 develop an awareness of the market and market movements. As agents participate in the market, the market will react directly to the agents' actions, providing a rich feedback loop for accelerated learning. As the agents advance their learning and develop strategies to take advantage of other participants, the baseline falls off and the market becomes largely driven by the competition between the different agents as they try to complete their orders.

As the learning process is data and time intensive, the machine engine 114 has an acceleration feature that enables an entire days' worth of trading data to be completed in minutes. This allows for an automated continuous training experience where an agent can participate in and experience over a months' worth of trading days in a single night.

The machine engine 114 implements sample complexity. Training of a reinforcement learning network 110 or agent is both data and time intensive. The reinforcement learning network 110 solves both these challenges by compressing a complete trading day (e.g. which can be estimated as a default of 6.5 hour or other duration) to minutes (e.g. under 5 minutes). Internally, the matching engine 114 manages a central timing service that publishes timestamps in fixed increments in some embodiments. This time is broadcasted out for downstream processes to listen to and is the baseline for the machine engine 114 internal logic, downstream processes, and integrated client logic. The frequency at which fixed timer updates are sent can be increased, which further increases the learning rate of agents participating in the machine engine 114. Although the baseline time step progresses at a fixed interval, incoming events into the machine engine 114 (such as new orders) enter the machine engine 114 in parallel to the fixed timer updates providing a realistic approximation to "real time" (or near real-time).

The machine engine 114 implements multi-agent training. The machine engine 114 supports the parallel training of multiple reinforcement learning networks 110 or agents. Each reinforcement learning network 110 or agent can make its own observations of the market, generate an action, and commit this action against the machine engine 114 changing the state of the market dynamically impacting the simulated market.

Actions from reinforcement learning networks 110 or agents are processed in price-time priority and can change the state of the market. Market state changes are published out to all agents, which makes a new decision based on the new state observation. The dynamic interaction of multiple agents' actions against the environment state allows the agents learning to be adversarial or competitive.

The machine engine 114 implements market realism. As the machine engine 114 is a dynamic environment that reacts to its participants' actions, when training reinforcement learning networks 110 at early stage the agents should not to have their learning corrupted by misleading datasets. As a result, providing a realistic market experience can facilitate accelerating the development of early stage reinforcement learning networks 110 or agents. The machine engine 114 achieves and enforces high quality experiences for its participants through a baseline liquidity making process that stimulates market activity and enforces a level realism on the market place.

This baseline liquidity can be implemented by machine engine 114 through a combination of a historical trading data and a derivative liquidity making process. In the early agent development stages this baseline is used to teach an awareness of basic market movements. Once the agents have become more sophisticated and are actively participating in the market in combination with the baseline process the full dynamics of a real-world market exchange can be simulated by machine engine 114.

In some embodiments, the machine engine 114 can start a new day (or process) by sampling a set orders internally from a database (e.g. KDB database). The sampled orders are then enriched before they are processed by the internal limit order book. The machine engine 114 implements an order enrichment process by normalizing the volume which can be done by applying the following with a configurable factor parameter:

$$ceil\left(\frac{\ln(\text{volume})}{\ln(\text{factor})}\right)*100$$

Volume normalization can normalize daily order volumes and remove occurrences of large outlier volumes.

After volume normalization, machine engine 114 can randomly re-sample the price for each order from a configurable range of plus/minus several cents. Randomly sampling prices allows the prices to cross, which allows orders of opposite sides to cross and generate trades internally stimulating market activity.

After price sampling, machine engine 114 can generate additional orders of the same side with decrementing prices for buys and increasing price increments for sells. This can be referred to as price layering, for example. The creation of new orders can allow the matching engine 114 to layer the internal limit order book when the orders are processed. By adding depth to the book the complexity of the market place is increased improving the market's realism as well as mitigating abnormal price swings as the agents learn to be more cognizant of the market impact of their actions.

As the reinforcement learning networks 110 or agents train, make observations and participate on the machine engine 114 the full complexities of a real-world exchange are simulated in this continuously evolving feedback loop. A reinforcement learning network 110 or agent can make observations of the dynamic states of the machine engine 114, generate actions based on these observations, evaluate its actions based on the market reaction and then learn from the experience. As the reinforcement learning networks 110 or agents become more and more sophisticated so does the machine engine 114 marketplace which can lead to both a better approximation of the complexities of real world exchanges and improved learning experience for all its participants.

Figure 3:
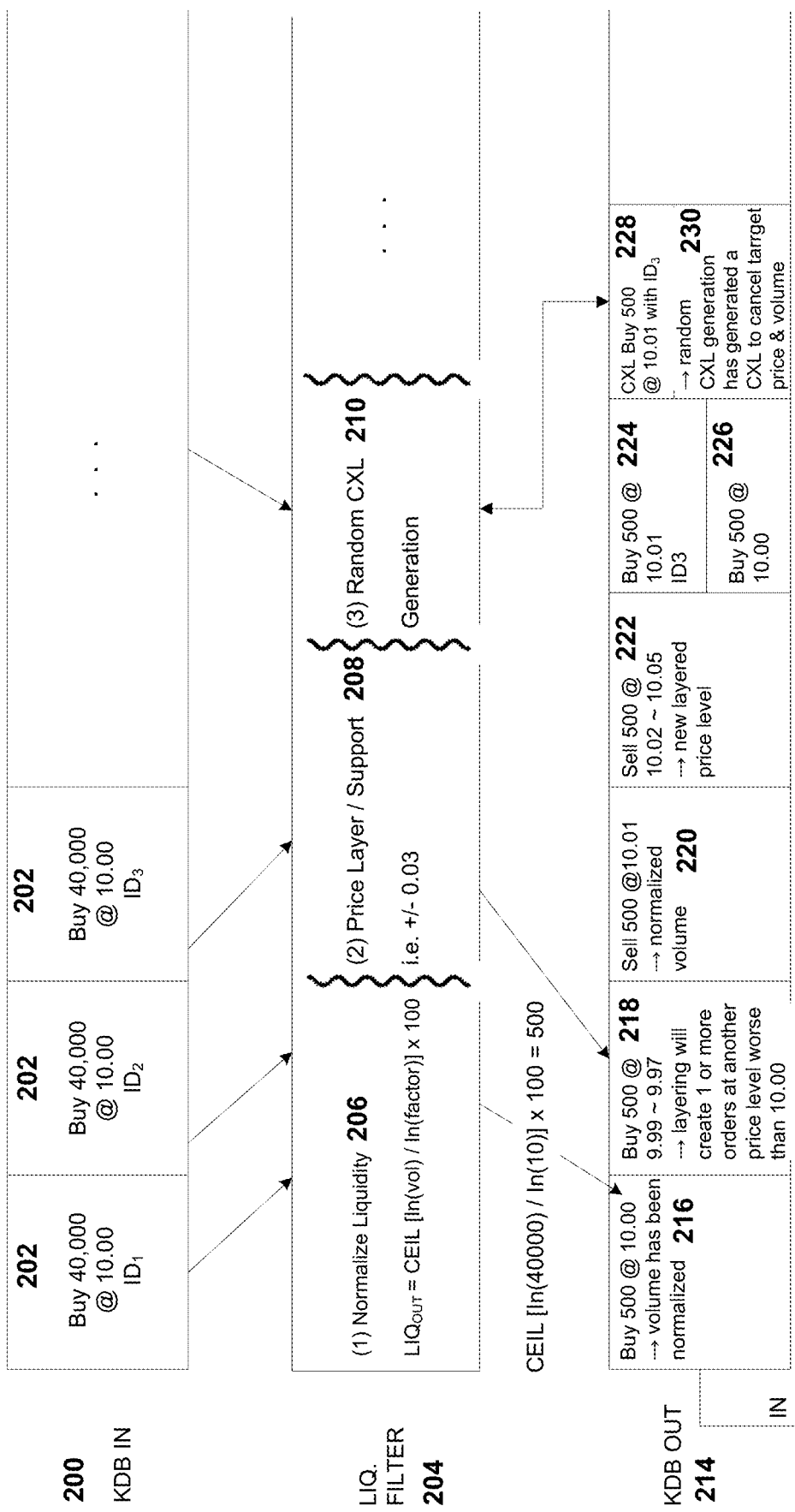
FIG. 3 is a flowchart showing aspects of an example method and data flow diagram according to some embodiments.

FIG. 3 is a flowchart diagram for a matching engine 114 according to some embodiments. The reinforcement learning networks 110 or agents connect to an environment that mimics an exchange and enables the agents to compete.

The matching engine 114 can sample orders from a database (referred to as $KDB_{in}$ 200). These can be historical trades sampled from the database, for example.

The matching engine 114 uses a liquidity filter 204 for a baseline liquidity implemented through a combination of a historical trading data and a derivative liquidity making process. The liquidity filter 204 is a part of the matching engine 114 to develop a baseline based on historical trends The liquidity filter 204 can normalize sample data at 206 such as by volume normalization with configurable parameters. The liquidity filter 204 implements price layer/support at 208 to sample prices which allows the prices to cross. The liquidity filter 204 implements random cxl generation at 210 for randomly sampling prices, for example. This can also generate controls to cancel pricing and volume. After price sampling, additional orders of the same side will be generated with decrementing prices for buys and increasing price increments for sells. The price layer/support at 208 can create orders at different price levels.

The matching engine 114 generates output for storage at the database at 214 (e.g. $KDB_{out}$). The matching engine 114 pushing results out to the database which can allow the result data to be accessed reinforcement learning networks 110 or agents.

An example is shown for a buy order of 40000 at 10. An example volume normalization is shown at 212 for the volume of 40000 and the factor of 10. The example shows that the normalized sample data (generated at 206) can have a volume normalization of buy 500 at 10 at 216. The price layer/support (at 208) can generate a buy order at a lower price level. In this example, at 218 this creates a buy order of 500 at 9.99 to 9.97 (e.g. a buy order at another price level lower than 10).

Other examples are shown such as a sell order of 20000 at 10.01 and a buy order of 20000 at 10.01. An example volume normalization is shown at 220 for a sell order of 500 at 10.01 and a new layered price level of a sell order of 500 at 10.02 to 10.05 at 222. An example volume normalization is shown at 224 for a buy order of 500 at 10.01 and a new layered price level of a buy order of 500 at 10 at 226. The random cxl generation 210 can trigger CXL buy order of 500 at 10.01 with identifiers at 228 or CXL to cancel target price and volume at 230.

Model Competition

In some embodiments, the matching engine 114 is configured to train the reinforcement learning network 110 by competing against other reinforcement learning networks 110 based on non-deterministic rules.

Embodiments described herein can teach market impact to the reinforcement learning network 110. A reinforcement learning network 110 uses the matching engine 114 to compete against other systems or reinforcement learning networks 110 or agents. This pitches the agents against each other in a non-deterministic world so that they may learn. For example, actions from reinforcement learning networks 110 or agents can be processed in price-time priority and can change the state of the market. Market state changes are published out to all reinforcement learning networks 110 or agents, which make new decisions based on the new state observation. The dynamic interaction of multiple agents' actions against the environment state allows the agents to compete as part of the learning process.

In some embodiments, the computing system 100 can configured interface application 130 with different hot keys for triggering control commands which can trigger different operations by computing system 100.

One Hot Key for Buy and Sell:

In some embodiments, the computing system 100 can configured interface application 130 with different hot keys for triggering control commands. An array representing one hot key encoding for Buy and Sell signals can be provided as follows:

Buy: [1, 0]
Sell: [0, 1]

One Hot Key for action: An array representing one hot hey encoding for action taken can be provided as follows:

Pass: [1, 0, 0, 0, 0, 0]
Aggressive: [0, 1, 0, 0, 0, 0,]
Top: [0, 0, 1, 0, 0, 0]
Append: [0, 0, 0, 1, 0, 0]
Prepend: [0, 0, 0, 0, 1, 0]
Pop: [0, 0, 0, 0, 0, 1]

As described herein or otherwise, with reference to FIG. 1, in some embodiments, a computing system for reinforcement learning in a dynamic resource environment. In some embodiments, the system includes one or more memories and one or more processors. The memory and processor are configured to provide an electronic resource environment.

In some embodiments, the electronic resource environment includes a matching engine 114 and a resource generating engine 113. In some embodiments, the matching engine and the resource generating engine can be processes and/or hardware and/or software computer logic which when executed perform one or more aspects of the methods described herein. While the functions described as being performed by the machine engine 114, resource generating engine 113, and any other aspect of the system may be described as being performed by an actual component, it should be understood that the functionality can be performed by the same processor(s), computer process(es) and/or computer hardware or software modules, or any physical or logical combination and/or variant.

Figure 4:
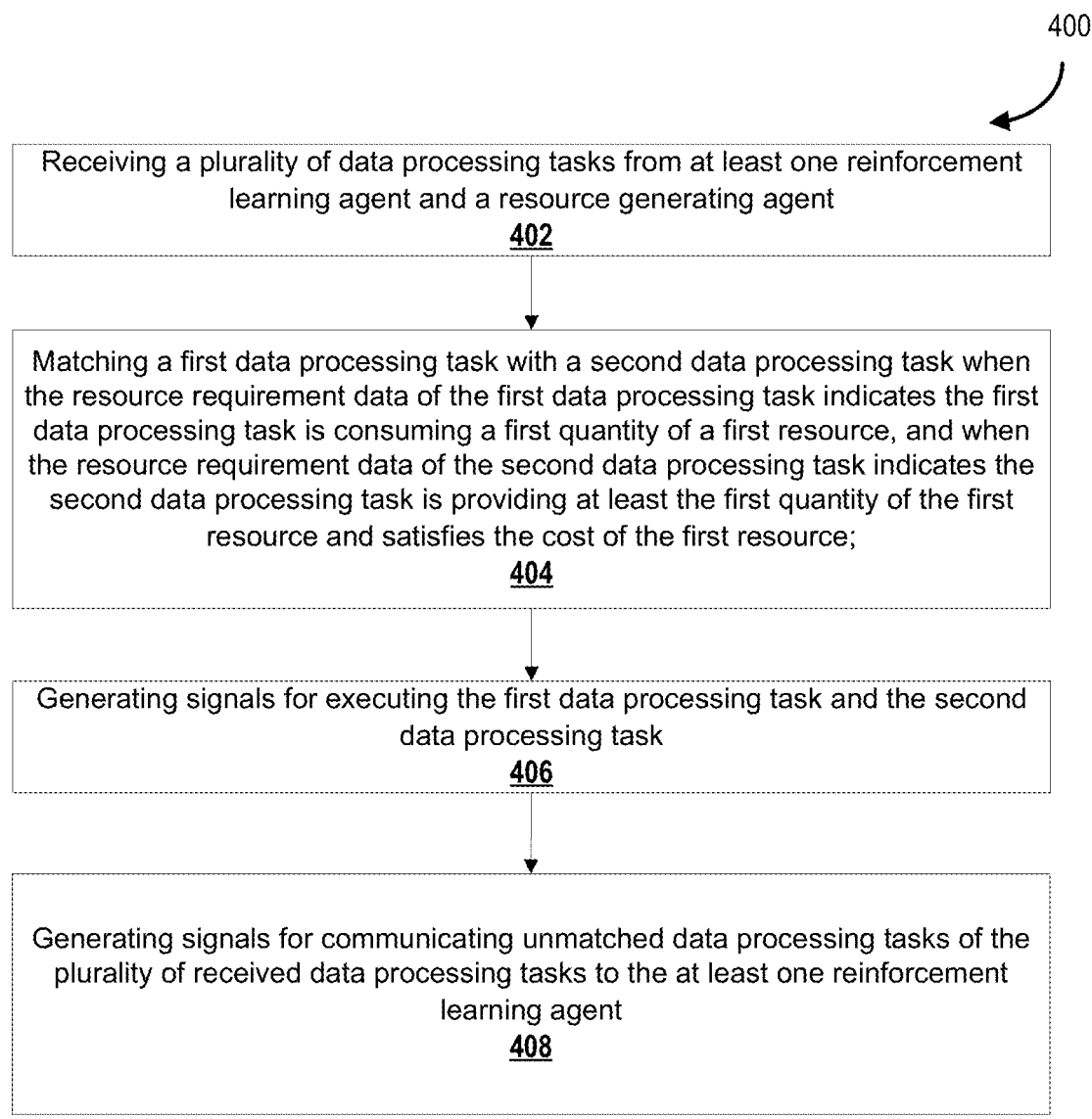
FIG. 4 is a flowchart showing aspects of an example method for an example matching engine.

FIG. 4 shows aspects of an example method 400 which provide functionality for a matching engine. The processor can be configured to receive, manage and/or process/match data processing tasks.

At 402, the processor receives one or more data processing tasks from one or more reinforcement learning agents and one or more resource generating agents. In some embodiments, each data processing task includes task resource requirement data. In some embodiments, the task resource requirement data identifies: a resource action indicating whether the data processing task is providing or consuming a resource, a cost of the resource, and a quantity of the resource to be provided or consumed. In embodiments where the electronic resource environment is at least part of an electronic trading system, the data processing task can represent instructions or a request to process a trading system order, and the task resource requirement data can identify a buy/sell/cancel or other action, a price associated with the action, and a quantity of the resource. In some embodiments, the resource can be an electronic representation of a financial asset such as a stock. In some embodiments, the task resource requirement data can provide identifying information about the resource (such as a stock symbol e.g. RY.TO). In some embodiments, the task resource requirement data identifies the resource required to satisfy or otherwise execute the data processing task.

In some embodiments, the received data processing tasks are stored as unmatched data processing tasks until they are matched. In some embodiments, the received data processing tasks can also be removed when they are cancelled or expire.

In some embodiments, posting a first new data processing task to the list can be considered to be providing resource(s), and sending a second new data processing task to capture at least a portion of the resource(s) provided by the first data processing task can be consider to be consuming resource (s). In other embodiments, a sell data processing task can be considered to be providing resource(s), and a buy data processing task can be considered to be consuming resource (s).

In some embodiments, the received data processing tasks are stored in conjunction with additional data such as an identifier associated with the agent which sent the data processing task, and a time and/or date at which the data processing task was received.

At 404, the processor matches two data processing tasks. In some embodiments, the two data processing tasks are matched from the data processing tasks which have been received by but not yet matched by the processor. In some embodiments, the processor matching a first data processing task with a second data processing task when the resource requirement data of the first data processing task indicates the first data processing task is consuming a first quantity of a first resource, and when the resource requirement data of the second data processing task indicates the second data processing task is providing at least the first quantity of the first resource and satisfies the cost of the first resource. For example, a data processing task which includes a buy action identifier, a quantity of 1000, and a price of $100, may be matched with another data processing task which includes a sell action identifier, a quantity of 500, and a price of $99. In another example, a data processing task which includes a sell action identifier, a quantity of 1000, and a price of $100, may be matched with another data processing task which includes a buy action identifier, a quantity of 500, and a price of $100 or $101.

In some embodiments, the matched data processing tasks can be based on any combination of factors in the resource requirement data or other metadata for a data processing tasks.

At 406, the processor generates signals for executing the matched data processing tasks. In some embodiments, generating the signals for executing the matched data processing tasks includes generating signals for communicating, to a reinforcement learning agent associated with one of the pair of matched data processing tasks. In some embodiments, the communication can include executed task data which can include, for example, an identifier identifying the matched data processing task, the consumed resource, the cost at which the resource was consumed, and the quantity of the consumed resource. In some embodiments, the clock for the dynamic include a time at which the resource was consumed. In some embodiments, at least a portion of this executed task data can be used as input or state data for training or consumption by one or more reinforcement learning agents.

In some embodiments, communicating the executed task data to the reinforcement learning agent includes sending a message to the reinforcement learning agent. In some embodiments, communicating the executed task data to the reinforcement learning agent includes updating a list of matched data processing tasks which can be polled, transmitted, broadcasted, pushed, pulled, or otherwise may available to the reinforcement learning agent(s). In some embodiments, the executed task data can be communicated to reinforcement learning agent(s) which were not one of the two agents associated with the pair of matched data processing tasks.

In some embodiments, the executed task data can be combined, normalized and/or used to created derivative or other data based on the executed task data to be used in training or providing inputs or state data to the reinforcement learning agents. For example, in some embodiments, the executed task data can be used to calculated volume weighted average prices, daily volumes, cumulative volumes, price movements/momentum, etc.

In some embodiments, executing the matched data processing tasks includes removing the matched data processing tasks from a list of unmatched data processing tasks.

At 408, the processor generating signals for communicating unmatched data processing tasks of the plurality of received data processing tasks to the at least one reinforcement learning agent. In some embodiments, communicating the unmatched data processing task data to the reinforcement learning agent includes updating a list of unmatched data processing tasks which can be polled, transmitted, broadcasted, pushed, pulled, or otherwise may available to the reinforcement learning agent(s). In some embodiments, the list or a portion of the list can sent to or accessed by the reinforcement learning agent.

In some embodiments, one or more of the communications from the matching engine and the reinforcement learning agents are in the form of a JSON data structure.

In some embodiments, the matching process and maintenance of the unmatched data processing tasks can occur continuously to simulate a dynamic resource environment. In some embodiments, the matched and maintenance/updating of the unmatched data processing tasks can be done continuously or at periodic time steps.

Figure 5:
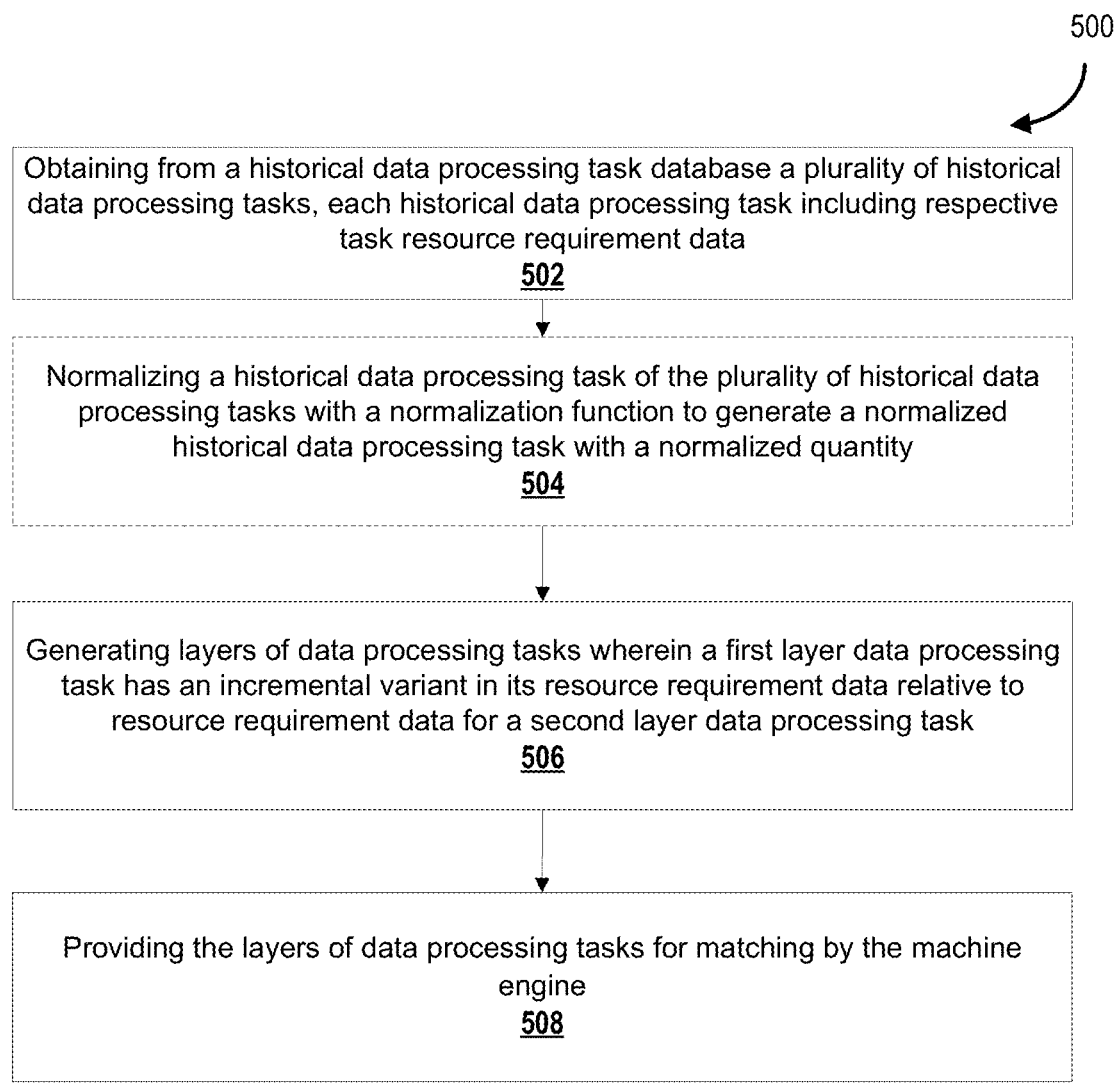
FIG. 5 is a flowchart showing aspects of an example method of an example resource generating agent.

FIG. 5 shows aspects of an example method 400 which provide functionality for a resource generating agent. The processor can be configured to generate and/or remove resources available for matching with the matching engine. In some embodiments, the resource generating agent helps to provide a dynamic resource environment for training reinforcement learning agents seeking to consume or provide resources in the environment.

At 502, the processor obtains from a historical data processing task database a plurality of historical data processing tasks, each historical data processing task including having respective task resource requirement data. In some embodiments, the historical data processing task database includes a record of historical data processing tasks which have been received and/or matched in the past. In some embodiments, the historical data processing task database include average historical data processing task data.

In some embodiments, the historical data processing task data is obtained from real dynamic resource environments (e.g. real stock exchange market data).

In some embodiments, a historical data processing task is obtained from the database 122 in order based on its original time in the database. For example, an example data structure received for a historical data processing task is shown below:

| Date | Time | Symbol | Bid | Ask | BidSize | AskSize |
|---|---|---|---|---|---|---|
| 2019.05.06 | 0D10:46:07.472197030 | RY.TO | 106.37 | 106.38 | 400 | 600 |

In some embodiments, a historical data processing task can be sampled or randomly selected from the database. In some embodiments, the sampling or random selection can be taken based on the current time period being simulated by the computing system's dynamic resource environment.

In some embodiments, at 504, the processor normalizes the obtained historical data processing task of the plurality of historical data processing tasks with a normalization function to generate a normalized historical data processing task with a normalized quantity. In some embodiments, the normalization function is configured to reduce or otherwise normalize a quantity of the resource in the obtained data processing task before layers of data processing tasks are generated. In some embodiments, the normalization function is based on:

$$ceil\left(\frac{\ln(\text{volume})}{\ln(\text{factor})}\right) * 100$$

In some embodiments, the factor is 100. In some embodiments, the factor is a machine learning hyperparameter. In some embodiments, adjusting the hyperparameter adjusts the available resources in the electronic resource environment provided by the resource generating agent. A lower factor may result in higher available liquidity in the matching-engine and a higher factor may result in lower available liquidity in the matching-engine. Through adjustment of this liquidity factor, the environment may dynamically simulate high resource availability (highly liquid) or low resource availability (highly illiquid markets) for the (trading) agents.

Other normalization functions may also be applied to the source volume from the historical database. In some embodiments, the normalization of the volume may be omitted.

At 506, the processor generates layers of data processing tasks based on the wherein a first layer data processing task has an incremental variant in its resource requirement data relative to resource requirement data for a second layer data processing task. In some embodiments, the incremental variant is a variant in the cost of a data processing task. For example, when the processor is configured to generate x=2 layers of data processing tasks for a reference order of BUY 1000 RY @ 10.0, 2 more price levels will be created at lower prices: First order: BUY 1000 RY @ 9.99; Second order: BUY 1000 RY @ 9.98.

In another example, for a reference order of SELL 1000 RY @ 10.0, 2 more price levels will be created at higher prices: First order: SELL 1000 RY 10.01; Second order: SELL 1000 RY 10.02.

In some embodiments, any number of layers can be generated. In some embodiments, the number of layers is a variance hyperparameter which can be adjusted. In some embodiments, a higher variance hyperparameter results in a high likelihood that data processing tasks generated by the resource generating agent will be matched with other data processing tasks generate by the resource generating agent rather than the reinforcement learning agent(s).

In some embodiments, the direction of the change in cost is based on the type of data processing task.

In some embodiments, the sampling and/or layering processes described herein are configured such that in some situations, they increase the randomness and base quantity of resources available in the unmatched data processing task list.

At 508, the processor provides the layers of data processing tasks for matching by the machine engine. In some embodiments, providing the layers includes providing the (normalized) historical data processing task as well as the generated layers of data processing tasks for matching by the matching engine.

With reference to FIG. 3, in some embodiments, the processor is configured to generate cancellation data processing tasks. In some embodiments, the cancellations are randomly generated to cancel/remove an order previously generated by the resource generation agent after a cancellation delay. In some embodiments, the cancellations can be generated for all data processing tasks or a randomly selected subset of the data processing tasks.

In some embodiments, the cancellation delay can be defined (e.g. 10 seconds), or can be randomly generated (e.g. based on a Gaussian distribution).

In some situations, generating cancellations can emulate a real dynamic resource environment where resources may only be available for a limited time.

In some embodiments, the processor manages a clock for the electronic resource environment, the clock for the electronic resource environment is faster than a wall clock time.

In some embodiments, the processor advances the clock for the electronic resource environment by one time interval once the matching engine has processed all possible matches in a current clock interval.

In some embodiments, the processor advances the clock for the electronic resource environment by one time interval once the reinforcement learning agent has processed a current state of the electronic resource environment and has submitted any data processing tasks based on the current state of the electronic resource environment.

In some embodiments, the processor advances the clock for the electronic resource environment based on a longest processing time required by: the at least one reinforcement learning agent, the matching engine, and the resource generating agent to complete their respective computations for a current time interval. In other words, in some embodiments, the processor advances the clock based on a timing critical path for the reinforcement learning agent(s), the matching engine, and the resource generating agent to complete their respective tasks for a time interval.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer-implemented system for reinforcement learning in a dynamic resource environment, the system comprising:
at least one memory and at least one processor configured to provide an electronic resource environment comprising:
a matching engine configured for:
receiving a plurality of data processing tasks from at least one reinforcement learning agent and a resource generating agent, each data processing task including task resource requirement data identifying: a resource action indicating whether the data processing task is providing or consuming a resource, a cost of the resource, and a quantity of the resource to be provided or consumed;
from the plurality of received data processing tasks, matching a first data processing task with a second data processing task when the resource requirement data of the first data processing task indicates the first data processing task is consuming a first quantity of a first resource, and when the resource requirement data of the second data processing task indicates the second data processing task is providing at least the first quantity of the first resource and satisfies the cost of the first resource;
generating signals for executing the first data processing task and the second data processing task; and
generating signals for communicating unmatched data processing tasks of the plurality of received data processing tasks to the at least one reinforcement learning agent; and
the resource generating agent configured for:
obtaining from a historical data processing task database a plurality of historical data processing tasks, each historical data processing task including respective task resource requirement data;
for a historical data processing task of the plurality of historical data processing tasks, generating layers of data processing tasks wherein a first layer data processing task has an incremental variant in its resource requirement data relative to resource requirement data for a second layer data processing task; and
providing the layers of data processing tasks for matching by the matching engine.

2. The system of claim 1, wherein generating the signals for executing the first data processing task and the second data processing task comprises:
generating signals for communicating, to a reinforcement learning agent associated with the first data processing task or the second data processing task, executed task data identifying the matched data processing task, the consumed resource, the cost of the resource, and the quantity of the consumed resource; the executed task data providing input or state data for the reinforcement learning agent.

3. The system of claim 1, wherein generating the signals for executing the first data processing task and the second data processing task comprises:
generating signals for communicating, to a reinforcement learning agent not associated with the first data processing task or the second data processing task, executed task data identifying the matched data processing task, the consumed resource, the cost of the resource, and the quantity of the consumed resource; the executed task data providing input or state data for the reinforcement learning agent.

4. The system of claim 1, wherein the resource generating agent is configured for:
normalizing a historical data processing task of the plurality of historical data processing tasks with a normalization function to generate a normalized historical data processing task with a normalized quantity; and generating the layers of data processing tasks from the normalized historical data processing task.

5. The system of claim 1, wherein the resource generating agent is configured for: sampling from a time-ordered set of data processing tasks to obtain the plurality of historical data processing tasks.

6. The system of claim 1, wherein the first layer data processing task has a higher or lower resource quantity requirement than the second layer data processing task.

7. The system of claim 5 wherein the sampling increases the randomness and base quantity of resources available in the unmatched data processing tasks.

8. The system of claim 1, wherein the at least one processor manages a clock for the electronic resource environment, the clock for the electronic resource environment is faster than a wall clock time.

9. The system of claim 8, wherein the at least one processor advances the clock for the electronic resource environment by one time interval once the matching engine has processed all possible matches in a current clock interval.

10. The system of claim 8, wherein the at least one processor advances the clock for the electronic resource environment by one time interval once the reinforcement learning agent has processed a current state of the electronic resource environment and has submitted any data processing tasks based on the current state of the electronic resource environment.

11. The system of claim 8, wherein the at least one processor advances the clock for the electronic resource environment based on a longest processing time required by: the at least one reinforcement learning agent, the matching engine, and the resource generating agent to complete their respective computations for a current time interval.

12. The system of claim 4, wherein the normalization function is based on a normalization hyperparameter, wherein adjusting the hyperparameter adjusts available resources in the electronic resource environment provided by the resource generating agent.

13. The system of claim 1, wherein generating the layers of data processing tasks is based on a variance hyperparameter, wherein a higher variance hyperparameter results in a high likelihood that data processing tasks generated by the resource generating agent will be matched with other data processing tasks generate by the resource generating agent rather than the at least one reinforcement learning agent.

14. The system of claim 1, wherein the electronic resource environment provides an environment in which a plurality of reinforcement learning agents are training in competition for resources.

15. A computer-implemented method for reinforcement learning in a dynamic resource environment, the method comprising:
receiving, with a matching engine, a plurality of data processing tasks from at least one reinforcement learning agent and a resource generating agent, each data processing task including task resource requirement data identifying: a resource action indicating whether the data processing task is providing or consuming a resource, a cost of the resource, and a quantity of the resource to be provided or consumed;
from the plurality of received data processing tasks, matching a first data processing task with a second data processing task when the resource requirement data of the first data processing task indicates the first data processing task is consuming a first quantity of a first resource, and when the resource requirement data of the second data processing task indicates the second data processing task is providing at least the first quantity of the first resource and satisfies the cost of the first resource;
generating signals for executing the first data processing task and the second data processing task;
generating signals for communicating unmatched data processing tasks of the plurality of received data processing tasks to the at least one reinforcement learning agent;
obtaining from a historical data processing task database a plurality of historical data processing tasks, each historical data processing task including respective task resource requirement data;
for a historical data processing task of the plurality of historical data processing tasks, generating layers of data processing tasks wherein a first layer data processing task has an incremental variant in its resource requirement data relative to resource requirement data for a second layer data processing task; and
providing the layers of data processing tasks for matching by the matching engine.

16. The method of claim 15, wherein generating the signals for executing the first data processing task and the second data processing task comprises:
generating signals for communicating, to a reinforcement learning agent associated with the first data processing task or the second data processing task, executed task data identifying the matched data processing task, the consumed resource, the cost of the resource, and the quantity of the consumed resource; the executed task data providing input or state data for the reinforcement learning agent.

17. The method of claim 15, wherein generating the signals for executing the first data processing task and the second data processing task comprises:
generating signals for communicating, to a reinforcement learning agent not associated with the first data processing task or the second data processing task, executed task data identifying the matched data processing task, the consumed resource, the cost of the resource, and the quantity of the consumed resource; the executed task data providing input or state data for the reinforcement learning agent.

18. The method of claim 15, wherein the resource generating agent is configured for:
normalizing a historical data processing task of the plurality of historical data processing tasks with a normalization function to generate a normalized historical data processing task with a normalized quantity; and
generating the layers of data processing tasks from the normalized historical data processing task.

19. The method of claim 15, wherein the resource generating agent is configured for:
sampling from a time-ordered set of data processing tasks to obtain the plurality of historical data processing tasks.

20. The method of claim 15, wherein the first layer data processing task has a higher or lower resource quantity requirement than the second layer data processing task.

21. The method of claim 19 wherein the sampling increases the randomness and base quantity of resources available in the unmatched data processing tasks.

22. The method of claim 15, comprising managing a clock for the dynamic resource environment, where the clock for the dynamic resource environment is faster than a wall clock time.

23. The method of claim 22, comprising advancing the clock for the electronic resource environment by one time interval once the matching engine has processed all possible matches in a current clock interval.

24. The method of claim 22, comprising advancing the clock for the electronic resource environment by one time interval once the reinforcement learning agent has processed a current state of the electronic resource environment and has submitted any data processing tasks based on the current state of the electronic resource environment.

25. The method of claim 22, comprising advancing the clock for the electronic resource environment based on a longest processing time required by: the at least one reinforcement learning agent, the matching engine, and the resource generating agent to complete their respective computations for a current time interval.

26. The method of claim 18, wherein the normalization function is based on a normalization hyperparameter, wherein adjusting the hyperparameter adjusts available resources in the electronic resource environment provided by the resource generating agent.

27. The method of claim 15, wherein generating the layers of data processing tasks is based on a variance hyperparameter, wherein a higher variance hyperparameter results in a high likelihood that data processing tasks generated by the resource generating agent will be matched with other data processing tasks generate by the resource generating agent rather than the at least one reinforcement learning agent.

28. The method of claim 15, wherein the dynamic resource environment provides an environment in which a plurality of reinforcement learning agents are training in competition for resources.

29. A non-transitory, computer readable medium or media having stored thereon data defining a reinforcement learning agent configured for competing for resources and trained in an electronic resource environment comprising:
    a matching engine configured for:
        receiving a plurality of data processing tasks from at least one reinforcement learning agent and a resource generating agent, each data processing task including task resource requirement data identifying: a resource action indicating whether the data processing task is providing or consuming a resource, a cost of the resource, and a quantity of the resource to be provided or consumed;
        from the plurality of received data processing tasks, matching a first data processing task with a second data processing task when the resource requirement data of the first data processing task indicates the first data processing task is consuming a first quantity of a first resource, and when the resource requirement data of the second data processing task indicates the second data processing task is providing at least the first quantity of the first resource and satisfies the cost of the first resource;
        generating signals for executing the first data processing task and the second data processing task; and
        generating signals for communicating unmatched data processing tasks of the plurality of received data processing tasks to the at least one reinforcement learning agent; and
    the resource generating agent configured for:
        obtaining from a historical data processing task database a plurality of historical data processing tasks, each historical data processing task including respective task resource requirement data;
        for a historical data processing task of the plurality of historical data processing tasks, generating layers of data processing tasks wherein a first layer data processing task has an incremental variant in its resource requirement data relative to resource requirement data for a second layer data processing task; and
        providing the layers of data processing tasks for matching by the matching engine.

* * * * *